United States Patent [19]

Mori et al.

[11] Patent Number: 5,413,204
[45] Date of Patent: May 9, 1995

[54] GLASS PLATE POSITIONING AND SUPPLYING MACHINE

[75] Inventors: Takeshi Mori; Masato Nakamura; Eiji Nakayama, all of Matsusaka, Japan

[73] Assignee: Central Glass Co., Ltd., Japan

[21] Appl. No.: 262,903

[22] Filed: Jun. 21, 1994

[30] Foreign Application Priority Data

Jun. 25, 1993 [JP] Japan .................................. 5-155636
Oct. 22, 1993 [JP] Japan .................................. 5-265123

[51] Int. Cl.⁶ .................................................. B65G 47/24
[52] U.S. Cl. ................................ 198/345.1; 198/411; 271/234
[58] Field of Search .................. 198/346.2, 345.1, 411, 198/434; 271/236, 234, 238, 239; 414/757, 781

[56] References Cited

U.S. PATENT DOCUMENTS 3,992,182 11/1976 Frank ........................... 198/571 X
5,133,256  7/1992 Keaton ......................... 414/781 X

*Primary Examiner*—Cheryl L. Gastineau
*Attorney, Agent, or Firm*—Cushman Darby & Cushman

[57] ABSTRACT

A glass plate positioning and supplying machine has a glass plate positioning machine disposed above a roller conveyor for adjusting the longitudinal, transverse, and rotational position of the glass plate, and a glass plate supplying machine disposed below the glass plate positioning machine for receiving the positioned glass plate from the glass plate positioning machine and supplying it onto the roller conveyor.

8 Claims, 6 Drawing Sheets

1

GLASS PLATE POSITIONING AND SUPPLYING MACHINE

BACKGROUND OF THE INVENTION

The present invention relates to a glass plate positioning and supplying machine.

When glass plates are processed with a cutting machine, a polishing machine, a washing machine, etc., they must be precisely positioned and supplied on a conveying roller to be transferred into the above mentioned machines.

Various types of glass plate positioning machines have been proposed. Japanese Utility Model Publication Sho 62-2187 discloses a glass plate positioning machine comprising a table disposed beside a conveying roller, a brush conveyor mounted on the table, stoppers disposed on the table, and a pusher disposed on the table, wherein the brush conveyor transfers the glass plate not only forward but also rearward, the stoppers restrict the movement of the glass plate on the brush conveyor, and the pusher moves at right angles to the moving direction of the glass plate on the brush conveyor while the glass plate is moved by the brush conveyor. Japanese Utility Model Laid-Open Publication Hei 1-126338 discloses a glass plate positioning machine comprising a glass plate holder having tiers of grooves for receiving glass plates, means for moving the glass plate holder in the vertical direction, a positioning unit for horizontally positioning a glass plate in the glass plate holder, and a transferring unit having suction pads for adhering to the horizontally positioned glass plate, wherein the transferring unit transfers the glass plates received in the grooves of the holder without bringing the glass plates into touch with the grooves. Japanese Utility Model Laid-Open Publication Hei 1-102130 discloses a glass plate positioning machine comprising a table having free rollers for supporting a glass plate transferred by a pair of belt conveyors, the table being movable in the vertical direction, means for positioning one of the long sides and one of the short sides of the glass plate, and means for applying force to the other one of the long sides and the other one of the short sides of the glass plate.

The glass plate positioning machine disclosed in Japanese Utility Model Publication Sho 62-2187 is disposed beside a conveying roller, so that it is rather hard to use in a case where a positioned glass plate must be transferred by the conveying roller, because the transferring operation of the positioned glass plate from the machine to the conveying roller is not easy. The glass plate positioning machine disclosed in Japanese Utility Model Laid-Open Publication Hei 1-126338 has a disadvantage in that it takes a rather long time for the transferring unit having suction pads to reciprocate. The glass plate positioning machine disclosed in Japanese Utility Model Laid-Open Publication Hei 1-102130 is designed to be used for positioning rectangular or trapezoidal glass plates and not for positioning triangular glass plates which are used for the window glasses of motor cars. Any of the aforementioned glass plate positioning machine adjusts the longitudinal position and the transverse position of the glass plate so as to position the glass plate. However, there are cases when the rotational position of a glass plate around a vertical axis must be slightly adjusted in line with a slight deviation from the designed rotational position of a mold to be used in the next stage of the processing of the glass plate. In such a case, none of the aforementioned glass plate positioning machines are able to promptly adjust the rotational position of the glass plate because the positions of the rollers which abut on the glass plate for adjusting its longitudinal and transverse positions must be slightly adjusted, which cannot be carried out promptly.

Various types of glass plate supplying machines have been proposed. Japanese Patent Publication Sho 53-46343 discloses a glass plate supplying machine comprising an endless conveyor which intermittently and reciprocally repeats rotations and stoppage, a plurality of suction means having a plurality of first suction pads which are disposed apart from each other and mounted on the endless conveyor, wherein the suction pads of the suction means adhere to a glass plate when the endless conveyor is stopped and release the glass plate after the conveyor has transferred the glass plate to its destination, which machine is characterized in that each suction means is provided with an exhaust port which is connected to the first suction pads and a check valve disposed on an exhaust passage connecting the exhaust port with the first suction pads, there are provided second movable suction pads which can be detachably connected to the exhaust port of the suction means which are located at an adhering position and a processing position, and the second movable suction pads are connected to an air exhauster. Japanese Utility Model Laid-Open Publication Hei 3-82318 discloses a glass plate supplying machine comprising a plurality of reciprocally movable belt conveyors disposed in parallel at a predetermined spacing, a supporting frame having a plurality of lattice-like openings disposed at a predetermined spacing which is the same as that between the reciprocally movable belt conveyors, a lifting apparatus for releasably receiving the supporting frame and moving the supporting frame in the vertical direction, and a receiving table which has a plurality of lattice-like rods disposed at a predetermined spacing which is the same that between the openings in the supporting frame.

The glass plate supplying machine disclosed in Japanese Patent Publication Sho 53-46343 has a disadvantage in that the glass plate may be broken when it falls after being released from the suction pads. The glass plate supplying machine disclosed in Japanese Utility Model Laid-Open Publication Hei 3-82318 has a disadvantage in that the lifting apparatus which receives the supporting frame must stop for a while before the glass plate is transferred from the endless belt conveyor onto the supporting frame because of the slow speed of the receiving table driven by a motor, an oil cylinder, etc.

SUMMARY OF THE INVENTION

An object of the present invention is to provide a glass plate positioning and supplying machine which can position not only rectangular glass plates but also triangular glass plates and can adjust not only the longitudinal and the transverse positions of the glass plate but also the rotational position of the glass plate, and which can quickly supply the glass plate on roller conveyor without causing breakage of the glass plate.

According to the present invention, there is provided a glass plate positioning and supplying machine comprising a glass plate positioning machine disposed above a roller conveyor which includes a horizontal rectangular main frame which has a pair of first beams extending in a first direction which coincides with the running direction of the roller conveyor and a pair of second beams extending in a second direction at right angles to the first direction, a pair of traveling beams which extend in the first direction and are supported by the second beams of the rectangular main frame at opposite ends thereof to be movable in the second direction, first adjusting means for adjusting the positions of the traveling beams in the second direction, first driving means for advancing and retracting the traveling beams in the second direction, a plurality of support units which engage the traveling beams to be movable in the first direction and the second direction, a plurality of first rollers mounted on the support units to be movable in the second direction, second driving means for advancing and retracting the first rollers in the second direction, a pair of second rollers disposed between the traveling beams, second adjusting means for adjusting the positions of the second rollers in the first and second directions, and third driving means for advancing and retracting the second rollers in the first direction, and a glass plate supplying machine disposed below the glass plate positioning machine, including a pair of vertical legs, an elevator plate which engages the vertical legs to be movable in the vertical direction, fourth driving means for advancing and retracting the elevator plate in the vertical direction, a pair of side vertical rods which engage the opposite side portions of the elevator plate to be movable in the vertical direction, a horizontal beam which is fixed to the upper ends of the vertical rods at opposite ends thereof, supporting rods mounted on the horizontal beam, a center vertical rod fixed to the center of the horizontal beam at the upper end thereof and extending downward, a pair of springs which are disposed one at either side of the vertical rod and fixed to the horizontal beam at the upper end thereof and the elevator plate at the lower end thereof, a trigger mounted on the elevator plate, fifth driving means for driving the trigger into and out of engagement with the lower end of the vertical rod, and a pair of stoppers mounted on the legs for engaging the lower ends of side vertical rods.

According to a preferred embodiment of the present invention, the glass plate positioning and supplying machine further comprises rotating means for rotating the horizontal rectangular main frame around a vertical axis.

According to another preferred embodiment of the present invention, the supporting rods are mounted on the horizontal beam to be movable in the first and second directions.

According to another preferred embodiment of the present invention, the glass plate positioning and supplying machine further comprises free supports mounted on the support units.

Further objects, features and advantages of the present invention will be apparent from the Detailed Description of the Preferred Embodiment when read in conjunction with the accompanying drawings.

DETAILED DESCRIPTION OF THE PREFERRED EMBODIMENT

A glass plate positioning and supplying machine in accordance with a preferred embodiment of the present invention will be described with reference to FIGS. 1 to 9. In the following description, the directions indicated by arrows I, II, III, IV, V and VI in FIGS. 1 to 9 are referred to as the forward direction, rearward direction, leftward direction, rightward direction, upward direction and downward direction, respectively. Moreover, in the following description, the direction parallel to the arrows I, II is referred to as the longitudinal direction, the direction parallel to the arrows III, IV is referred to as the transverse direction, and the direction parallel to the arrows V, VI is referred to as the vertical direction.

Figure 1:
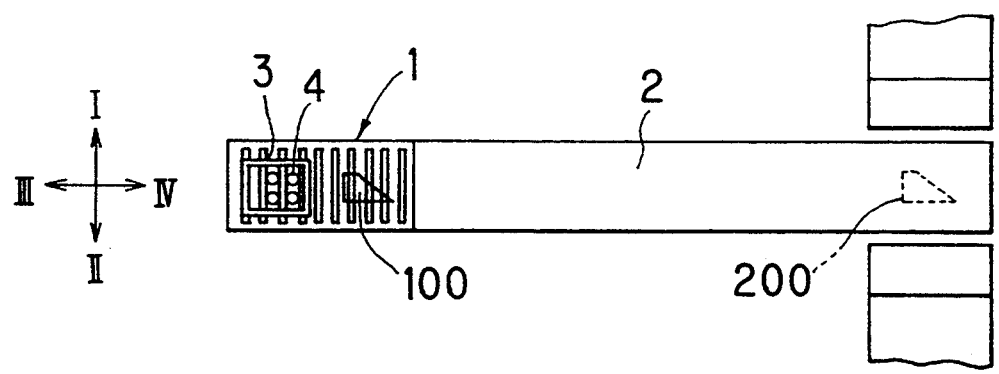
FIG. 1 is a plan view showing the general arrangement of a glass plate processing system which is provided with a glass plate positioning and supplying machine in accordance with a preferred embodiment of the present invention.

As shown in FIG. 1, a transverse roller conveyor 1 is disposed at the left of the inlet of a transverse furnace 2. A glass plate positioning machine 3 is disposed above the roller conveyor 2. A glass plate supplying machine 4 is disposed below the glass plate positioning machine 3. A glass plate 100 is positioned by the glass plate positioning machine 3. Then the glass plate 100 is supplied onto the roller conveyor 1 by the glass plate supplying machine 2. The glass plate 100 is then transferred into the furnace 2. The glass plate 100 is heated while being transferred rightward in the furnace 2. When the heated glass plate reaches the right end of the furnace 2, it is placed on a vacuum mold 200 which bends it.

Figure 2:
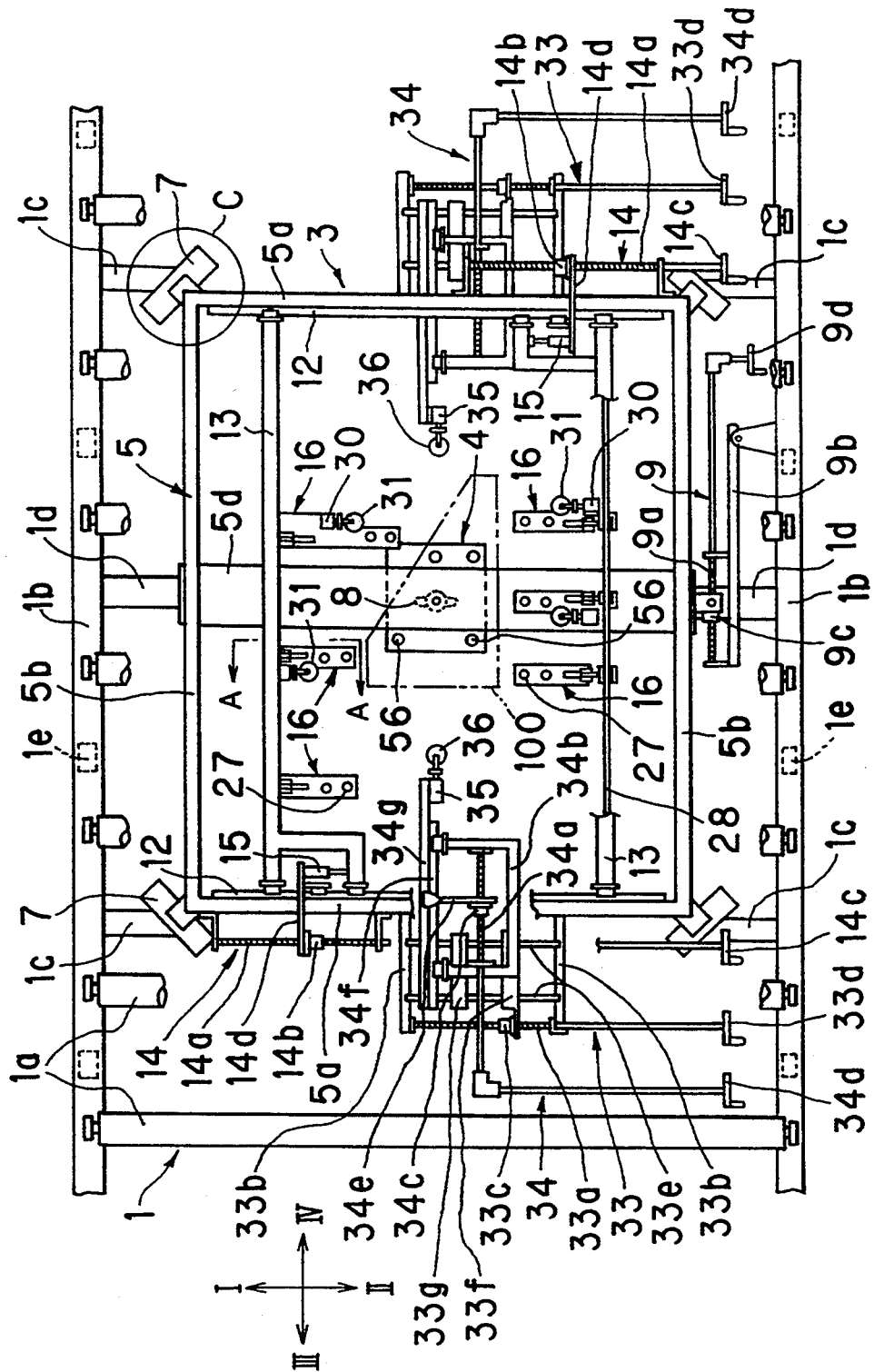
FIG. 2 is a plan view, partially cut away, of the glass plate positioning machine in FIG. 1.

As shown in FIG. 2, the roller conveyor 1 has longitudinal rollers 1a spaced from each other in the transverse direction, a pair of transverse beams 1b disposed below the longitudinal rollers 1a by which the longitudinal rollers 1a are rotatably supported at opposite ends thereof, longitudinal beams 1c, 1d disposed below and between the longitudinal rollers 1a and fixed to the transverse beams 1b at the opposite ends thereof, and vertical beams 1e for supporting the transverse beams 1b.

The structure of the glass plate positioning machine will be described with reference to FIGS. 2 to 6.

Figure 3:
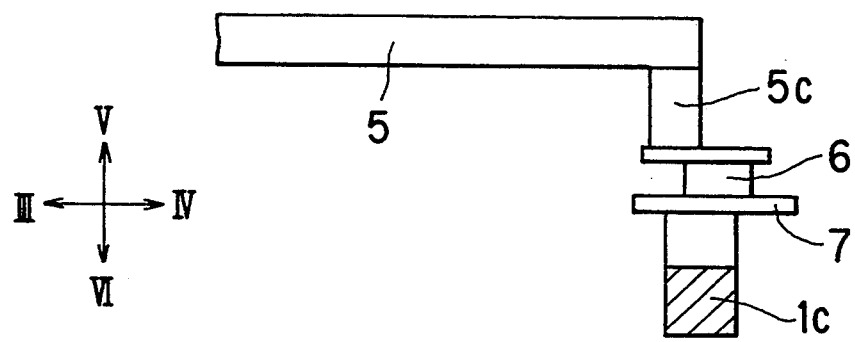
FIG. 3 is a side view of a sliding support of a main frame indicated by circle C in FIG. 2.
Figure 4:
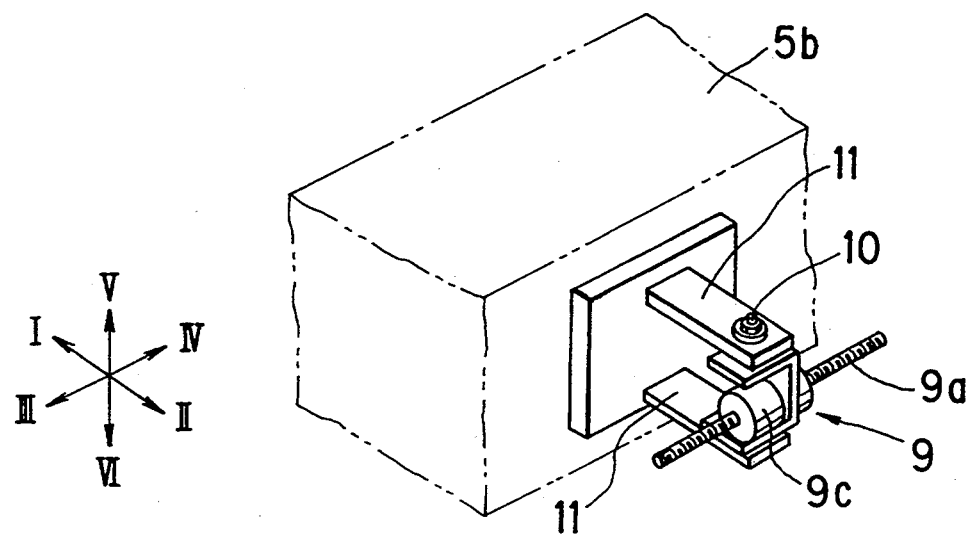
FIG. 4 is a perspective view of a rotational position adjusting member in FIG. 2.

As shown in FIGS. 2 to 4, a rectangular main frame 5 which has a pair of longitudinal beams 5a and a pair of transverse beams 5b is disposed horizontally above the roller conveyor 1. The main frame 5 is provided with legs 5c on the underside of its corners. The legs 5c are provided with metallic members 6 at their lower ends. The metallic members 6 rest on support plates 7 fixed to the end portions of the upper sides of the longitudinal beams 1c. Thus, the main frame 5 is supported by the longitudinal beams 1c to be slidable horizontally.

The main frame 5 is provided with a central longitudinal beam 5d which is disposed below the transverse beams 5b. The central longitudinal beam 5d has an inverted portal configuration as viewed from the right. The central longitudinal beam 5d is connected to the underside of the center portions of the transverse beams 5b at the upper ends of its vertical leg portions. The center portion of the central longitudinal beam 5d present between the vertical leg portions is located below the rollers 1a. The center portion of the central longitudinal beam 5d is supported by a bearing 8 mounted at the center of the longitudinal beam 1d of the roller conveyor 1 at its center and is rotatable around a vertical axis extending through the bearing 8.

A rotational position adjusting device 9 including a ball-screw 9a, a support member 9b by which the ball-screw 9a is supported to be rotatable, a nut 9c engaging the ball-screw 9a, and a handle 9d for rotating the ball-screw 9a, is supported via one end of the support member 9b by one of the transverse beams 1b of the roller conveyor 1 to be rotatable around a vertical axis. As best shown in FIG. 4, the nut 9c is connected to the center of one of the transverse beams 5b of the main frame 5 through pins 10 and brackets 11 to be rotatable around a vertical axis.

Thus, the main frame 5 can be rotated around the vertical axis extending through the bearing 8 by operating the rotational position adjusting device 9. The rotation of the main frame 5 is restricted by the contact between the vertical legs of the central longitudinal beam 5d of the main frame 5 and the rollers 1a of the roller conveyor As shown in FIG. 2, a longitudinal rail 12 is fixed to the inner side surface of each longitudinal beam 5a. A pair of transverse traveling beams 13 engage the rails 12 at their opposite ends to be movable longitudinally.

A longitudinal position adjusting device 14 is disposed beside each longitudinal beam 5a. The longitudinal position adjusting device 14 includes a longitudinal ball-screw 14a supported by the longitudinal beam 5a to be rotatable, a nut 14b engaging the ball-screw 14a, a handle 14c for rotating the ball-screw 14a, and a bracket 14d fixed to the nut 14b.

An air cylinder 15 is fixed to the bracket 14d.

One of the traveling beams 13 is fixed to the piston of the air cylinder 15 fixed to the bracket 14d of one of the longitudinal position adjusting devices 14. The other of the traveling beams 13 is fixed to the piston of the air cylinder 15 fixed to the bracket 14d of the other of the longitudinal position adjusting devices 14.

A plurality of support units 16 are mounted on the traveling beams 13. The support units 16 mounted on one traveling beam 13 are opposed to the support units 16 mounted on the other traveling beam 13.

Figure 5:
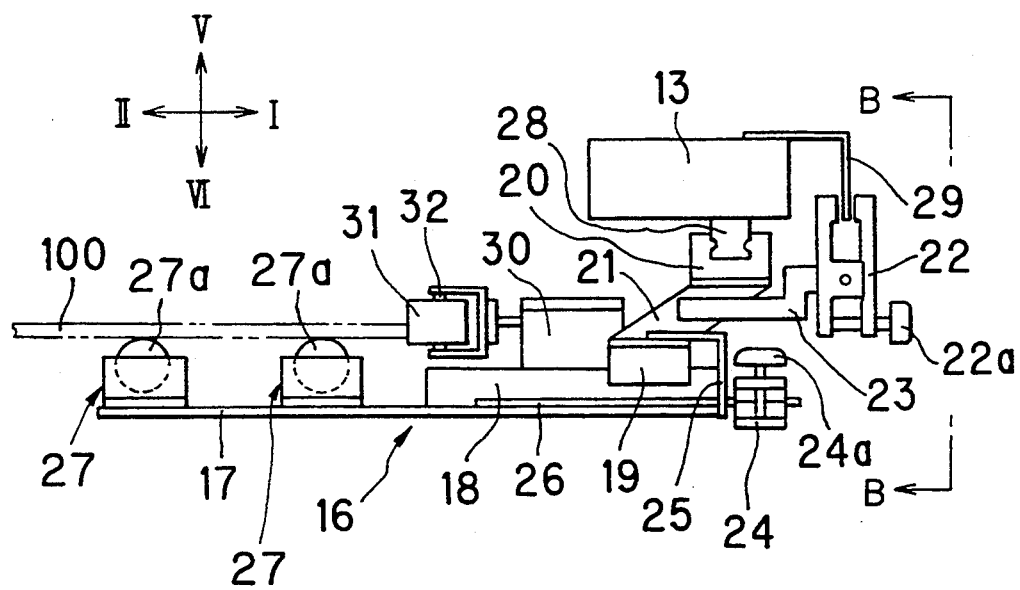
FIG. 5 is a right side view of a support unit as viewed toward arrows A in FIG. 2.
Figure 6:
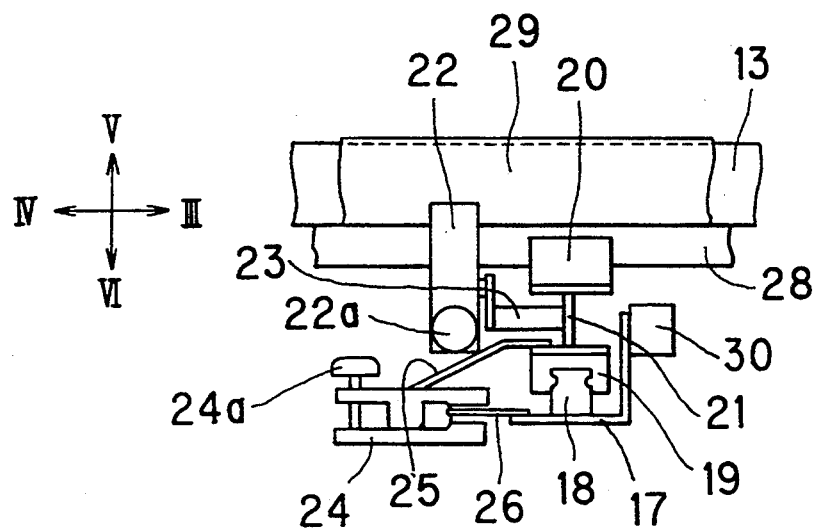
FIG. 6 is a front side view of a support unit as viewed toward arrows B in FIG. 5.

As shown in FIGS. 5, 6, the support unit 16 includes a longitudinal base plate 17. A longitudinal rail 18 is fixed to the longitudinal base plate 17. A traveling table 19 slidably engages the longitudinal rail 18. A traveling table 20 is disposed above and fixed to the traveling table 19 through a bracket 21. A stopper 22 which looks like a clothespin and has a screw 22a at its one end is fixed to the traveling table 19 through a bracket 23 and the bracket 21. A stopper 24 which looks like a clothespin and has a screw 24a at its one end is fixed to the traveling table 19 through a bracket 25. A graduated fixing plate 26 is fixed to the base plate 17. The stopper 24 can be made to clamp/release the fixing plate 26 by tightening/loosening the screw 24a. Free supports 27 including ball members 27a are mounted on the base plate 17. The traveling table 20 slidably engages a transverse rail 28 fixed to the underside of the traveling beam 13. The stopper 22 can be made to clamp/release a graduated fixing plate 29 fixed to the traveling beam 13 by tightening/loosening the screw 22a.

As shown in FIGS. 2, 5, and 6, some of the support units 16 are provided with longitudinal air cylinders 30. A roller 31 is connected to the end of the piston of each cylinder 30 through a vertical pin 32 to be rotatable around the pin 32. The roller 31 is resiliently supported in the vertical direction by springs fitted on the pin 32. The springs are not shown for the sake of the simplicity of the drawings.

As shown in FIG. 2, a longitudinal position adjusting device 33 is disposed beside each longitudinal beam 5a. The longitudinal position adjusting device 33 includes a longitudinal ball-screw 33a rotatably supported by the longitudinal beam 5a through a pair of brackets 33b, a nut 33c engaging the ball-screw 33a, a handle 33d for rotating the ball-screw 33a, a pair of longitudinal rails 33e whose opposite ends are fixed to the brackets 33b, a traveling table 33f fixed to the nut 33c and slidably engaged with the longitudinal rails 33e, and a traveling table 33g slidably engaged with the longitudinal rails 33e.

A transverse position adjusting device 32 is disposed above the longitudinal position adjusting device 34. The transverse position adjusting device 34 includes a transverse ball-screw 34a rotatably supported by an inverted portal frame 34b mounted on the traveling tables 33f, 33g of the longitudinal position adjusting device 33, a nut 34c engaging the ball-screw 34a, a handle 34d for rotating the ball-screw 34a, a bracket 34e fixed to the nut 34c, a transverse rail 34f fixed to the inverted portal frame 34b, and a traveling table 34g fixed to the bracket 34e and slidably engaged with the transverse rail 34f.

The traveling table 34g is provided with a transverse air cylinder 35. A roller 36 is connected to the end of the piston of the air cylinder 35 by a vertical pin to be rotatable around the pin. The roller 36 is resiliently supported in the vertical direction by springs fitted on the pin. The pin and the springs are not shown for the sake of the simplicity of the drawings.

The position adjusting devices 9, 14, 33, and 34 are provided with digital position indicators adjacent to the handles 9d, 14c, 33d, and 34d respectively.

Figure 7:
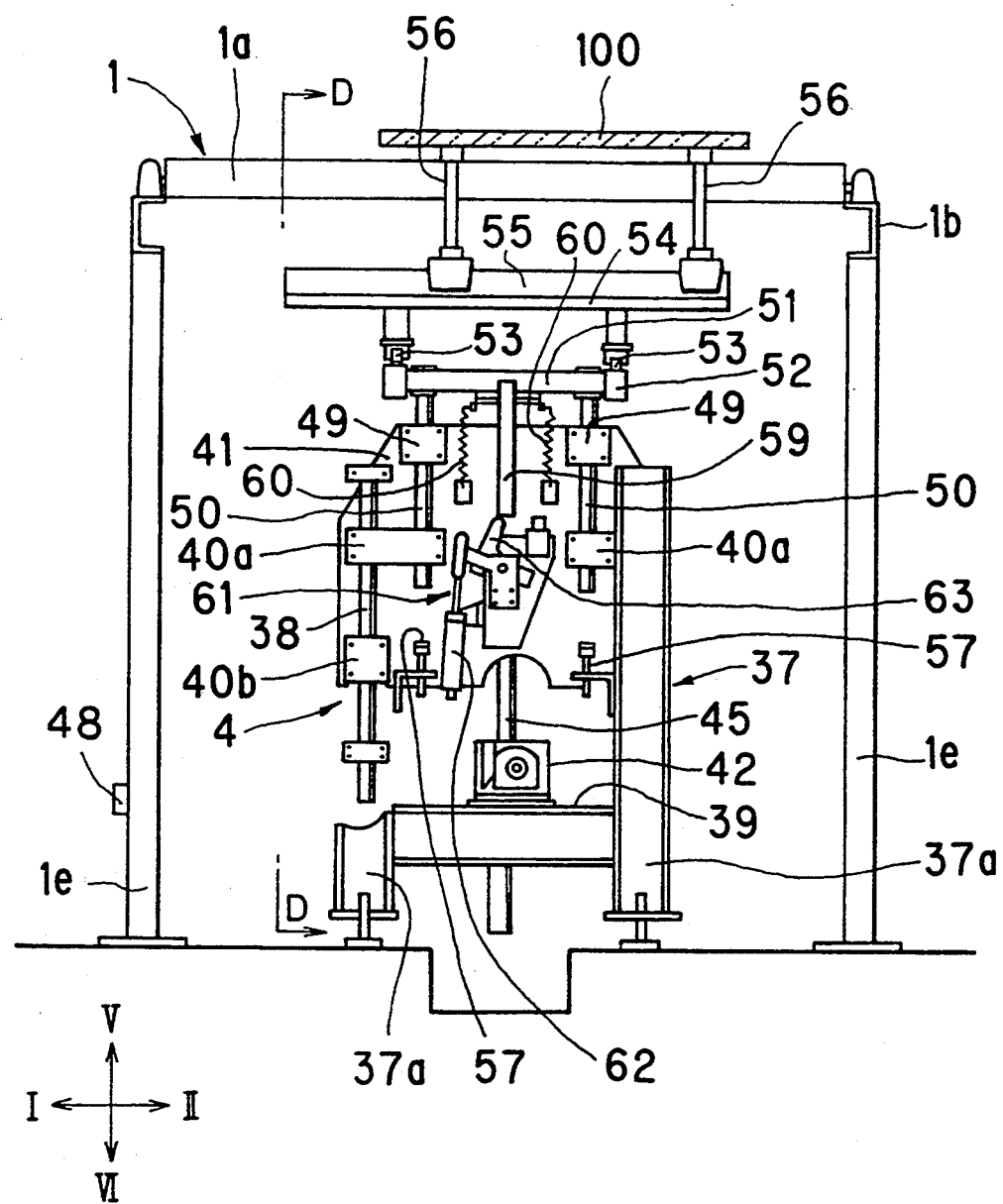
FIG. 7 is a left side view, partially cut away, of the glass plate supplying machine in FIG. 1.
Figure 8:
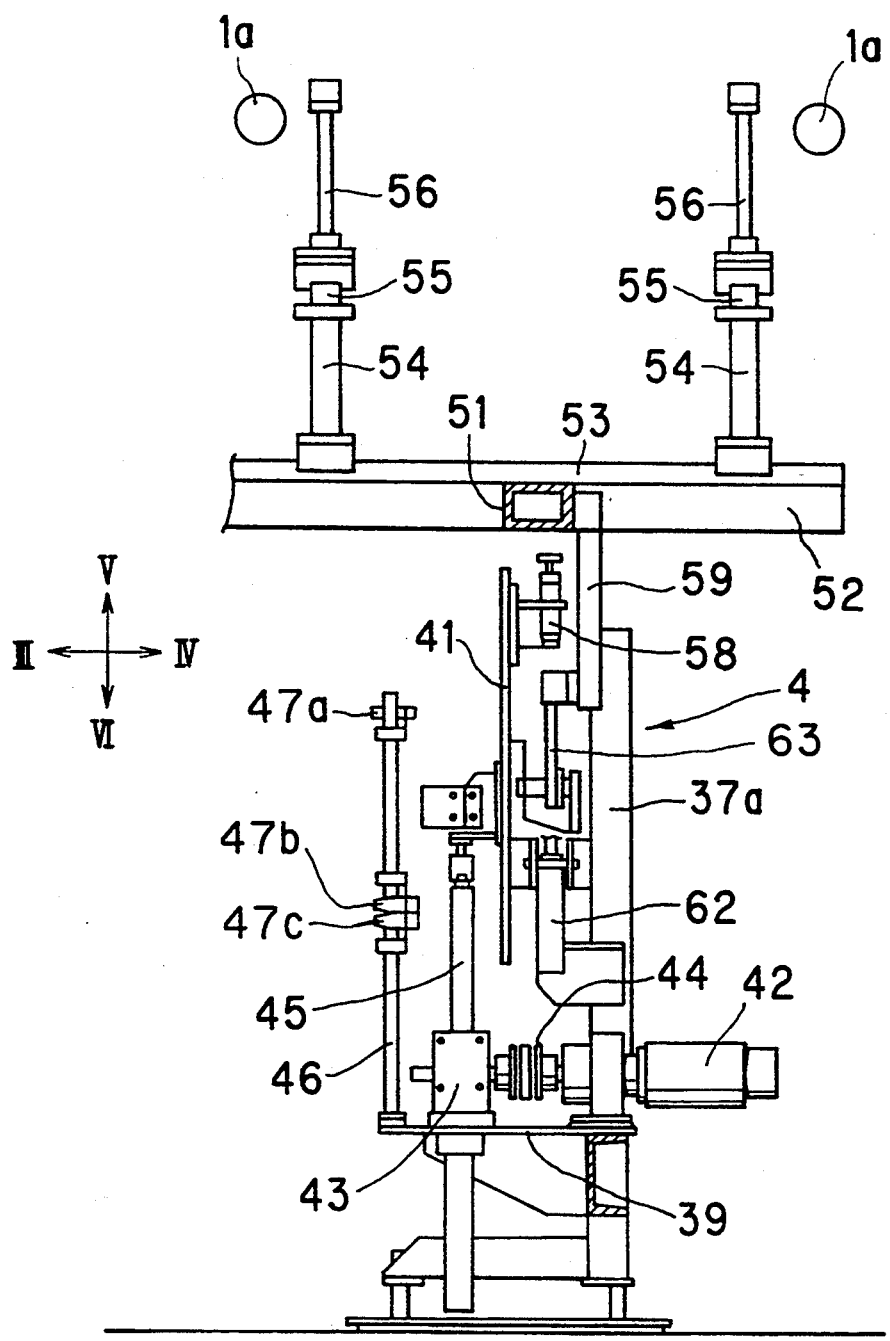
FIG. 8 is a front side view of the glass plate supplying machine as viewed toward arrows D in FIG. 7.
Figure 9:
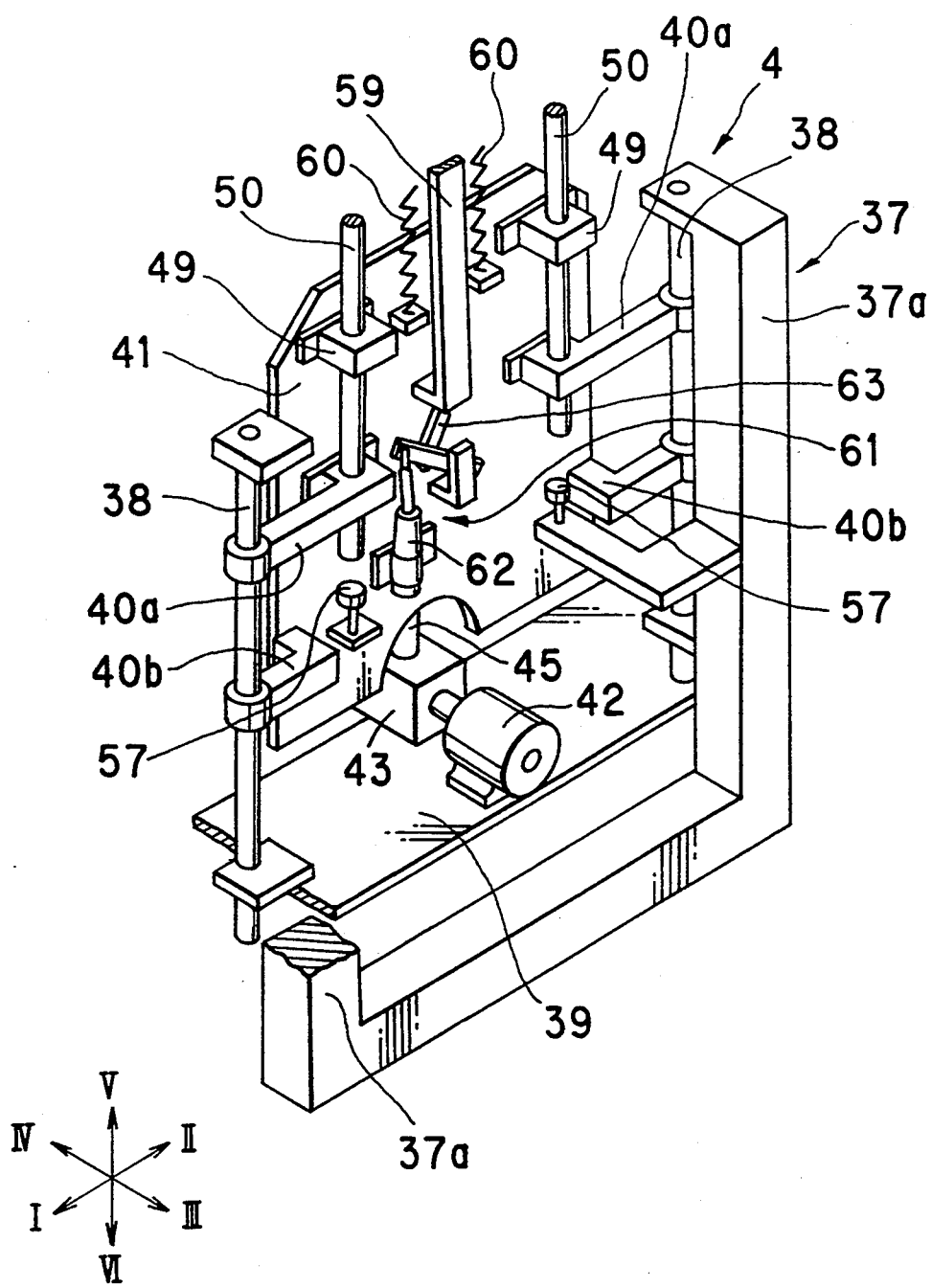
FIG. 9 is a perspective view, partially cut away, of the glass plate supplying machine.

The construction of the glass plate supplying machine will be described with reference to FIGS. 7 to 9.

An inverted portal frame 37 is disposed below the rollers 1a of the roller conveyor 1 and between the vertical frames 1e of the roller conveyor 1 which are spaced from each other in the longitudinal direction. Each vertical leg 37a of the inverted portal frame 37 is provided with a vertical rod 38. The inverted portal frame 37 is provided with a base plate 39 fixed to the vertical legs 37a at the opposite ends thereof. An upper arm 40a and a lower arm 40b slidably engage each vertical rod 38 at one ends thereof. The upper arms 40a and the lower arms 40b are fixed to an elevator plate 41 at the other ends thereof. A servomotor 42 and a jack 43 are mounted on the base plate 39. The output shaft of the servomotor 42 operatively engages the jack 43 through a coupling 44. A shaft 45 which is driven vertically by the jack 43 is fixed to the elevator plate 41 at its upper end. A vertical rod 46 is mounted on the base plate 39. The vertical rod 46 is provided with sensors 47a, 47b and 47c for detecting the vertical position of the elevator plate The sensor 47a which is located uppermost is disposed for preventing the elevator plate 41 from overrunning upwardly. The sensor 47c which is located lowermost is disposed for preventing the elevator plate 41 from overrunning downwardly. The sensor 47b which is located in the middle is disposed for detecting the elevator plate 41 being in a datum position. A control unit 48 is mounted on one of the vertical frames 1e of the roller conveyor 1. The control unit 48 controls the operation of the servomotor 42 based on signals from an encoder included in the servomotor 42 so as to control the vertical movement of the elevator plate 41 from the datum position.

The elevator plate 41 is provided with a guide block 49 at each upper side corner thereof. A vertical guide rod 50 extends through the guide block 49 and the upper arm 40a below the guide block 49 to be slidable in the vertical direction. A horizontal beam 51 is fixed to the upper ends of the guide rods 50 at its opposite ends. A transverse beam 52 is fixed to each end of the horizontal beam 51. A transverse rail 53 is mounted on each transverse beam 52. A pair of traveling tables 52 disposed apart from each other in the transverse direction engage the rail 53 to be slidable in the transverse direction. A longitudinal rail 55 is mounted on each traveling table 54. A pair of supporting rods 56 disposed apart from each other in the longitudinal direction engage each longitudinal rail 55 to be slidable in the longitudinal direction. The traveling tables 54 and the supporting rods 56 are provided with stopper devices like the stopper 24 and the fixing plate 26 of the glass plate positioning machine 3.

The vertical legs 37a of the inverted portal frame 37 are provided with stoppers 57 for abutting the lower ends of the vertical guide rods 50 to support them. The elevator plate 41 is provided with a buffer 58 for abutting the horizontal beam 51 to support it at upper center portion thereof.

The horizontal beam 51 is provided with a vertical rod 59 at its center. The vertical rod 59 extends downward. A pair of springs 60 are disposed one at either side of the vertical rod 59. The springs 60 are fixed to the horizontal beam 51 at the upper ends thereof and to the elevator plate 41 at the lower ends thereof. A support device 61 is mounted on the elevator plate 41 below the lower end of the vertical rod 59. The support device 61 includes a vertical air cylinder 62 and a L-shaped trigger 63 which is connected to the piston of the air cylinder 62 to be rotated around a transverse axis and which can engage the lower end of the vertical rod 59.

The operation of the above described glass plate positioning and supplying machine will be now described.

e,crc/1/ The pistons of the air cylinders 15 fixed to the bracket 14d of the longitudinal position adjusting devices 14 are advanced. The support units 16 are moved along the longitudinal rails 18 and the transverse rails 28 to positions which are predetermined according to the size and the shape of the glass plate 100 to be positioned, with the graduations marked on the fixing plates 26 and 29 as guides. The support units 16 are fixed at the predetermined positions by means of the stoppers 22 and 22. The longitudinal positions of the traveling beams 13 are adjusted by the longitudinal position adjusting devices 12 with the indications of the digital position indicators of the devices 14 as guides.

② The longitudinal positions and the transverse positions of the rollers 36 are adjusted by the longitudinal position adjusting devices 33 and the transverse position adjusting devices 32 according to the size and the shape of the glass plate 100 to be positioned, with the indications of the digital position indicators of the devices 33 and 32 as guides.

③ The rotational position of the rectangular main frame 5 is adjusted in line with the rotational position of the vacuum mold 200, by the rotational position adjusting device 9 with the indication of the digital position indicator of the device 9 as a guide. The adjustment of the rotational position of the rectangular main frame 5 can be carried out promptly.

④ The pistons of the air cylinders 30, 35 are retracted.

After the steps ①~④ the glass plate positioning machine 3 is now standing by.

⑤ The trigger 63 is rotated by operation of the air cylinder 62 so as to engage the lower end of the vertical rod 59.

The traveling tables 54 and the supporting rods 56 are moved along the rails 53 and 55 to positions which are predetermined according to the size and the shape of the glass plate 100 to be supplied. The traveling tables 54 and the supporting rods 56 are fixed at the predetermined positions by means of the stoppers.

⑥ The elevator plate 41 is moved up by the operation of the servomotor 42, the coupling 44, the jack 43, and the shaft 45. The horizontal beam 51 and the supporting rods 56 which are supported by the horizontal beam 51 also move up following to the elevator plate 41. The vertical position of the elevator plate 41 is detected by counting the signals from the encoder included in the servomotor 42. When the elevator plate 41 reaches a first predetermined height, the servomotor 42 is stopped by the control signal from the control unit 48 which receives the signals from the encoder. The supporting rods 56 are between and slightly below the rollers 1a of the roller conveyor 1. Thus, the glass plate supplying machine is now standing by.

⑦ A glass plate 100 is transferred from a pallet(not shown) to the glass plate positioning machine 3. The glass plate 100 is placed on the free supports 27 of the supports units 16.

⑧ The pistons of the air cylinders 35 are advanced. The rollers 36 abut the left and right side edges of the glass plate 100. Then, the pistons of the air cylinders 30 are advanced. The rollers 31 abut the fore and rear side edges of the glass plate 100. Thus, the glass plate 100 is clamped by the rollers 36 and 31 to be positioned in the longitudinal, transverse, and rotational directions. As described in ①, ②, the support units 16 or the rollers 31, and the rollers 36 are positioned according to the size and the shape of the glass plate 100 to be positioned, so that, regardless of its size and the shape, the glass plate 100 can be positioned by the rollers 33 and 36. As described in ③, the rotational position of the rectangular main frame 5 is adjusted in line with the rotational position of the vacuum mold 200, so that, the glass plate 100 can be precisely positioned in the rotational direction. The glass plate 100 is placed on the free supports 27 of the supports units 16 where it can freely move horizontally during the above described positioning operation. This protects the glass plate 100 from damage.

⑨ The servomotor 42 of the glass plate supplying machine 4 is started to move the elevator plate 41 up to a second predetermined height. The supporting rods 56 project slightly above the rollers 1a of the roller conveyor 1 to abut the lower surface of the glass plate 100 and push it up. The glass plate 100 clamped by the rollers 31, 36, together with the rollers 31, 36, moves up against the biasing forces from the springs fitted on the pins which connect the rollers 31, 36 to the pistons of the air cylinders 30, 35. Thus, the glass plate 100 lifts off the free supports 27 of the support unit 16. The pistons of the air cylinders 30, 35 are retracted. Thus the rollers 31, 36 are separated from the glass plate 100. The glass plate 100 is now supported by the supporting rods 56 of the glass plate supplying machine 4. The air cylinders 15 fixed to the brackets 14d of the longitudinal position adjusting devices 14 are retracted to move the traveling beams 13. Thus, the support units 16 separate from the glass plate 100 as viewed from above.

10 The piston of the air cylinder 62 of the glass plate supplying machine 4 is retracted. The trigger 63 is rotated to be released from engagement with the lower end of the vertical rod 59. The horizontal beam 51 quickly moves down under the biasing forces of the springs 60. After a short downward movement, the horizontal beam 51 abuts on the buffer 58. Thus, the downward movement of the horizontal beam 51 is gently stopped. The supporting rods 56 which are connected to the horizontal beam 51 through the traveling tables 52 also quickly move down slightly below the rollers 1a of the roller conveyor 1. Thus, the glass plate 100 is quickly supplied onto the rollers 1a of the roller conveyor 1. The speed of the downward movement of the glass plate 100 is high so that the glass plate 100 is supplied onto the rollers 1a, which are rotating, without any deviation from the adjusted longitudinal, transverse, and rotational position being caused. As the distance of the downward movement of the glass plate 100 is short, the glass plate 100 is supplied onto the roller conveyor 1 without being damaged.

11 The glass plate 100 is supplied onto the rollers 1a with its adjusted longitudinal, transverse, and rotational positions maintained unchanged and is then transferred into the furnace 2 by the roller conveyor 1. After being heated in the furnace 2, the glass plate 100 is placed on the vacuum mold 200. Since the longitudinal, transverse, and rotational positions of the glass plate 100 have been adjusted by the glass plate positioning machine 3 and the glass plate 100 has been supplied onto the roller conveyor 1 with the adjusted longitudinal, transverse, and rotational positions maintained unchanged, the glass plate 100 can entirely and precisely overlap the vacuum mold 200.

12 The elevator plate 41 is moved down by the operation of the servomotor 42. Following the elevator plate 41, the horizontal beam 51, which is supported by the buffer 58, also moves down. The lower ends of the vertical guide rods 50 abut on the stoppers 57 which are fixed to the inverted portal frame 37. Thus, the vertical guide rods 50 are supported by the stoppers 57. As the elevator plate 41 continues its downward movement, the springs 60 are elongated. Thus, biasing forces are generated in the springs 60. The servomotor 42 is stopped so that the downward movement of the elevator plate 41 is stopped. Now, there is such a distance between the vertical rod 59 and the trigger 63 as to allow the rotation of the trigger 63. The piston of the air cylinder 62 is advanced to rotate the trigger 63. Thus, the trigger 63 again engages the lower end of the vertical rod 59.

13 The pistons of the air cylinders 15 are advanced.

14 The steps ⑤ ~ 13 are repeated so that a plurality of glass plates 100 are positioned and supplied onto the roller conveyor 1.

While the present invention has been described with reference to the preferred embodiments, one of ordinary skill in the art will recognize that modifications and improvements may be made while remaining within the spirit and scope of the present invention. The scope of the invention is determined solely by the appended claims.

We claim:

1. A glass plate positioning and supplying machine, which comprises:
    (a) a glass plate positioning machine disposed above a roller conveyor, including:
        a horizontal rectangular main frame which has a pair of first beams extending in a first direction which coincides with the running direction of the roller conveyor and a pair of second beams extending in a second direction at right angles to the first direction;
        a pair of traveling beams which extend in the first direction and are supported by the second beams of the rectangular main frame at opposite ends thereof to be movable in the second direction;
        first adjusting means for adjusting the positions of the traveling beams in the second direction;
        first driving means for advancing and retracting the traveling beams in the second direction;
        a plurality of support units which engage the traveling beams to be movable in the first direction and the second direction;
        a plurality of first rollers mounted on the support units to be movable in the second direction;
        second driving means for advancing and retracting the first rollers in the second direction;
        a pair of second rollers disposed between the traveling beams;
        second adjusting means for adjusting the positions of the second rollers in the first and second directions; and
        third driving means for advancing and retracting the second rollers in the first direction; and
    (b) a glass plate supplying machine disposed below the glass plate positioning machine, including:
        a pair of vertical legs;
        an elevator plate which engages the vertical legs to be movable in the vertical direction;
        fourth driving means for advancing and retracting the elevator plate in the vertical direction;
        a pair of side vertical rods which engage the opposite side portions of the elevator plate to be movable in the vertical direction;
        a horizontal beam which is fixed to the upper ends of the vertical rods at opposite ends thereof;
        supporting rods mounted on the horizontal beam;
        a center vertical rod fixed to the center of the horizontal beam at the upper end thereof and extending downward;
        a pair of springs which are disposed one at either side of the vertical rod and fixed to the horizontal beam at the upper end thereof and the elevator plate at the lower end thereof;
        a trigger mounted on the elevator plate;
        fifth driving means for driving the trigger into and out of engagement with the lower end of the vertical rod; and
        a pair of stoppers mounted on the legs for engaging the lower ends of side vertical rods.

2. A glass plate positioning and supplying machine according to claim 1 further comprising rotating means for rotating the horizontal rectangular main frame around a vertical axis.

3. A glass plate positioning and supplying machine according to claim 1 wherein said supporting rods are mounted on the horizontal beam to be movable in the first and second directions.

4. A glass plate positioning and supplying machine according to claim 2 wherein said supporting rods are mounted on the horizontal beam to be movable in the first and second directions.

5. A glass plate positioning and supplying machine according to claim 1 further comprising free supports mounted on the support units.

6. A glass plate positioning and supplying machine according to claim 2 further comprising free supports mounted on the support units.

7. A glass plate positioning and supplying machine according to claim 3 further comprising free supports mounted on the support units.

8. A glass plate positioning and supplying machine according to claim 4 further comprising free supports mounted on the support units.

* * * * *